(12) United States Patent
Duong et al.

(10) Patent No.: US 7,381,331 B2
(45) Date of Patent: Jun. 3, 2008

(54) HYDROPHILIC MEMBRANE AND ASSOCIATED METHOD

(75) Inventors: Hieu Minh Duong, Clifton Park, NY (US); Hongyi Zhou, Niskayuna, NY (US); Rainer Koeniger, Clifton Park, NY (US); Daniel Joseph Brunelle, Burnt Hills, NY (US); Daniel Robert Olson, Voorheesville, NY (US); Karmin Lorraine Olson, Kansas City, MO (US)

(73) Assignee: General Electric Company, Niskayuna, NY (US)

( * ) Notice: Subject to any disclaimer, the term of this patent is extended or adjusted under 35 U.S.C. 154(b) by 272 days.

(21) Appl. No.: 11/241,227

(22) Filed: Sep. 30, 2005

(65) Prior Publication Data

US 2007/0075013 A1    Apr. 5, 2007

(51) Int. Cl.
*B01D 39/00* (2006.01)
*B01D 39/14* (2006.01)
*B01D 71/14* (2006.01)
*B01D 29/00* (2006.01)
*B01D 63/00* (2006.01)

(52) U.S. Cl. .................... 210/500.42; 210/500.27; 210/500.37; 210/490; 210/500.36; 264/48; 264/49; 427/245

(58) Field of Classification Search ............... 210/490, 210/500.27, 500.37, 500.36, 500.41, 500.42; 204/489; 427/245; 428/422, 426; 264/48–49; 96/4, 6
See application file for complete search history.

(56) References Cited

U.S. PATENT DOCUMENTS

| | | | |
|---|---|---|---|
| 4,113,912 A | 9/1978 | Okita | |
| 4,189,369 A | 2/1980 | Fang | |
| 4,193,138 A | 3/1980 | Okita | |
| 4,194,041 A | 3/1980 | Gore et al. | |
| 4,242,208 A * | 12/1980 | Kawaguchi et al. | 210/500.28 |
| 4,247,401 A | 1/1981 | Bloch et al. | |
| 4,318,714 A | 3/1982 | Kimura et al. | |
| 4,419,187 A | 12/1983 | Cheng et al. | |
| 4,466,931 A | 8/1984 | Tanny | |
| 4,477,634 A | 10/1984 | Linder et al. | |
| 4,525,374 A | 6/1985 | Vaillancourt | |
| 4,584,103 A | 4/1986 | Linder et al. | |
| 4,604,204 A | 8/1986 | Linder et al. | |
| 4,659,474 A | 4/1987 | Perry et al. | |
| 4,690,765 A | 9/1987 | Linder et al. | |
| 4,690,766 A | 9/1987 | Linder et al. | |
| 4,720,345 A | 1/1988 | Linder et al. | |
| 4,753,725 A | 6/1988 | Linder et al. | |
| 4,767,645 A | 8/1988 | Linder et al. | |
| 4,776,959 A | 10/1988 | Kasai et al. | |
| 4,778,596 A | 10/1988 | Linder et al. | |
| 4,833,014 A | 5/1989 | Linder et al. | |
| 4,889,636 A | 12/1989 | Perry et al. | |
| 4,911,844 A | 3/1990 | Linder et al. | |
| 4,991,844 A * | 2/1991 | Derry | 273/120 R |
| 5,024,765 A | 6/1991 | Linder et al. | |
| 5,028,337 A | 7/1991 | Linder et al. | |
| 5,032,282 A | 7/1991 | Linder et al. | |
| 5,039,421 A | 8/1991 | Linder et al. | |
| 5,041,225 A | 8/1991 | Norman | |
| 5,049,275 A | 9/1991 | Gillberg-LaForce et al. | |
| 5,049,282 A | 9/1991 | Linder et al. | |
| 5,059,327 A * | 10/1991 | Takegami | 210/500.34 |
| 5,084,173 A * | 1/1992 | Nitadori et al. | 210/321.89 |
| 5,087,338 A | 2/1992 | Perry et al. | |
| 5,090,422 A | 2/1992 | Dahl et al. | |
| 5,130,024 A | 7/1992 | Fujimoto et al. | |
| 5,151,182 A | 9/1992 | Perry et al. | |
| 5,156,780 A | 10/1992 | Kenigsberg et al. | |
| 5,162,894 A * | 11/1992 | Asano et al. | 257/691 |
| 5,209,850 A | 5/1993 | Abayasekara et al. | |
| 5,302,127 A | 4/1994 | Crisio, Jr. | |
| 5,304,307 A | 4/1994 | Linder et al. | |
| 5,354,587 A | 10/1994 | Abayasekara | |
| 5,430,099 A | 7/1995 | Linder et al. | |
| 5,539,072 A | 7/1996 | Wu | |
| 5,597,863 A | 1/1997 | Linder et al. | |
| 5,599,506 A | 2/1997 | Linder et al. | |
| 5,716,660 A | 2/1998 | Weadock et al. | |
| 5,755,762 A | 5/1998 | Bush | |
| 5,874,165 A | 2/1999 | Drumheller | |

(Continued)

FOREIGN PATENT DOCUMENTS

| | | |
|---|---|---|
| EP | 0 408 378 | 1/1991 |
| EP | 0 456 939 | 11/1991 |
| EP | 0 498 348 | 8/1992 |
| WO | WO 95/13859 | 5/1995 |
| WO | WO 96/03202 | 2/1996 |
| WO | WO 96/08149 | 3/1996 |
| WO | WO 96/20040 | 7/1996 |
| WO | WO 03/101505 | 12/2003 |

OTHER PUBLICATIONS

European Search Report dated Nov. 29, 2006.
Co-Pending U.S. Appl. No. 11/077,760, filed Mar. 11, 2005, entitled "Composite Membrane Having Hydrophilic Properties and Method of Manufacture".

(Continued)

*Primary Examiner*—Ana Fortuna
(74) *Attorney, Agent, or Firm*—Shawn A. McClintic; William E. Powell, III

(57) ABSTRACT

A membrane is provided, which may include a microporous base membrane; and a cross-linkable coating disposed on a surface of the membrane. The coating may include polyvinyl nucleophilic polymer and a urethane or a blocked isocyanate. The coating may be cross-linked. Also provided is a method of making the membrane.

22 Claims, No Drawings

U.S. PATENT DOCUMENTS

| | | | |
|---|---|---|---|
| 5,897,955 A * | 4/1999 | Drumheller | 428/422 |
| 5,902,745 A | 5/1999 | Butler et al. | |
| 5,989,426 A * | 11/1999 | Hirose et al. | 210/500.38 |
| 6,018,819 A | 2/2000 | King et al. | |
| 6,179,132 B1 | 1/2001 | Moya | |
| 6,228,477 B1 | 5/2001 | Klare et al. | |
| 6,261,678 B1 | 7/2001 | Von Fragstein et al. | |
| 6,270,844 B2 | 8/2001 | McClain et al. | |
| 6,273,271 B1 | 8/2001 | Moya | |
| 6,331,351 B1 | 12/2001 | Waters et al. | |
| 6,354,443 B1 | 3/2002 | Moya | |
| 6,395,383 B1 | 5/2002 | Maples | |
| 6,403,726 B1 | 6/2002 | Ward | |
| 6,410,084 B1 | 6/2002 | Klare et al. | |
| 6,676,993 B2 | 1/2004 | Klare | |
| 6,752,847 B2 | 6/2004 | Smithies | |
| 6,854,603 B2 | 2/2005 | Klare | |
| 6,878,278 B2 * | 4/2005 | Mickols | 210/500.38 |
| 6,951,602 B1 * | 10/2005 | Reuter et al. | 204/489 |
| 7,122,250 B2 * | 10/2006 | Kinsho et al. | 428/407 |
| 2003/0091750 A1 | 5/2003 | Chen | |

OTHER PUBLICATIONS

Beatrice Haimovich et al., "A New Method for Membrane Construction on ePTFE Vascular Grafts: Effect on Surface Morphology and Platelet Adhesion", Correspondence to: B. Haimovich, Contract Grant Sponsor: Cardiovascular Institute at Robert Wood Johnson Medical School, pp. 1393-1400, 1997.

Mikhail Kozlov et al., "Adsorption of Poly(vinyl alcohol) Onto Hydrophobic Substrates. A General Approach for Hydrophilizing and Chemically Activating Surfaces", Macromolecules, vol. 36, pp. 6054-6059, Jul. 2003.

T. Tokiwa et al., "Restoration of Differentiated Functions in Multicellular Aggregates of a Human Liver Epithelial Cell Line", Materials Science and Engineering, vol. C 6, pp. 249-252, 1998.

Roki Techno Co. Ltd, Certainpore PTFE CT, 2 pages, Data Sheet made Jan. 2005.

* cited by examiner

HYDROPHILIC MEMBRANE AND ASSOCIATED METHOD

BACKGROUND

1. Technical Field

The invention includes embodiments that may relate to a hydrophilic membrane. The invention includes embodiments that may relate to a method of making a hydrophilic membrane.

2. Discussion of Related Art

Membranes with high porosity, wetability, and chemical resistance may be useful in, for example, liquid size exclusion filtration applications. Polytetrafluoroethylene (PTFE) would be desirable for its chemical resistance, and expanded PTFE (ePTFE) would be desirable for both chemical resistance and porosity. However, due to the hydrophobicity property of PTFE, liquid water filtration is problematic and may require treatment.

Hydrophilicity may be imparted to an ePTFE membrane by, for example, impregnation using a tetrafluoroethylene/vinyl alcohol copolymer. Such an approach leverages the chemical affinity of the perfluoropolymer in the coating material to the perfluoropolymer of the ePTFE. However, the affinity is sufficiently low that hydrophilicity may be temporary. A porous fluoropolymeric membrane having continuous pores from one side to the other may be rendered hydrophilic by coating the membrane interior with a mixture of a fluoroaliphatic surfactant and a hydrophilic but water insoluble polyurethane. Such an approach may leverage the chemical affinity between the perfluoropolymers to form a two-layer system.

In another approach, hydrophilicity of PTFE membrane may be produced by irradiation treatment of the PTFE powdered resin. The resin may be processed with a porogen and virgin PTFE powder to render a microporous PTFE membrane.

Commercially available hydrophilic ePTFE membranes may be used for liquid water filtration. In addition to the problematic production considerations, these membranes may be prewetted by membrane manufacturers and shipped wet to end-users. Such a membrane may dewet or dry. The drying of the membrane may render it ineffective and may necessitate, for example, undesirable shipping considerations (such as wet shipping). Other undesirable aspects may include economic considerations such as the need for special handling and sealable containers, and increased shipping weight, and the like.

It may be desirable to have a membrane with properties that differ from those properties of currently available membranes. It may be desirable to have a membrane produced by a method that differs from those methods currently available.

BRIEF DESCRIPTION

The invention provides a membrane in one embodiment. The membrane may include a microporous base membrane; and a cross-linkable coating disposed on a surface of the membrane. The coating may include polyvinyl nucleophilic polymer and a urethane or a blocked isocyanate.

In one embodiment, a treated membrane may include a microporous base membrane; and a cross-linked coating disposed on a surface of the membrane. The coating may include a polyvinyl nucleophilic polymer and a urethane or a blocked isocyanate.

In one embodiment, a method of forming a membrane is provided. The method may include applying a coating to a surface of a porous base membrane. The coating may include a polyvinyl nucleophilic polymer and a urethane or a blocked isocyanate.

DETAILED DESCRIPTION

The invention includes embodiments that may relate to a hydrophilic membrane. The invention includes embodiments that may relate to a method of making a hydrophilic membrane.

Approximating language, as used herein throughout the specification and claims, may be applied to modify any quantitative representation that could permissibly vary without resulting in a change in the basic function to which it is related. Accordingly, a value modified by a term or terms, such as "about", is not to be limited to the precise value specified. In some instances, the approximating language may correspond to the precision of an instrument for measuring the value.

In one embodiment, an initially hydrophobic base membrane, such as an expanded polytetrafluoroethylene (ePTFE) membrane, may be coated with a polymerizable precursor material. The precursor material may be cross-linked using a urethane or a blocked isocyanate.

Suitable ePTFE membranes may be commercially obtainable from General Electric Energy (Kansas City, Mo.). Other materials and methods can be used to form the membrane having an open pore structure. For example, other suitable materials that can be used to form the membrane include one or more of polyolefin, polyamide, polyester, polysulfone, polyether, acrylic and methacrylic polymers, polystyrene, polyurethane, polypropylene, polyethylene, polyphenelene sulfone, cellulosic polymer, polyphenylene oxide, and combinations of two or more thereof. As used herein, a base membrane may refer to an uncoated membrane, while the more general term of membrane may refer to a membrane that comprises an embodiment of the invention, unless language or context indicates otherwise.

The base membrane may be rendered permeable by, for example, one or more of perforating, stretching, expanding, bubbling, or extracting the base membrane. Suitable methods of making the membrane also may include foaming, skiving or casting any of the suitable materials. In alternate embodiments, the membrane may be formed from woven or non-woven fibers.

In one embodiment, continuous pores may be produced. Suitable porosity may be in a range of greater than about 10 percent by volume. In one embodiment, the porosity may be in a range of from about 10 percent to about 20 percent, from about 20 percent to about 30 percent, from about 30 percent to about 40 percent, from about 40 percent to about 50 percent, from about 50 percent to about 60 percent, from about 60 percent to about 70 percent, from about 70 percent to about 80 percent, from about 80 percent to about 90 percent, or greater than about 90 percent by volume. Here and throughout the specification and claims, range limitations may be combined and/or interchanged. Such ranges are identified by their range limitations, and include all the sub-ranges contained therein unless context or language indicates otherwise.

Pore diameter may be uniform from pore to pore, and the pores may define a predetermined pattern. Alternatively, the pore diameter may differ from pore to pore, and the pores may define an irregular pattern. Suitable pore diameters may be less than about 50 micrometers. In one embodiment, an average pore diameter may be in a range of from about 50 micrometers to about 40 micrometers, from about 40 micrometers to about 30 micrometers, from about 30 micrometers to about 20 micrometers, from about 20 micrometers to about 10 micrometers, from about 10 micrometers to about 1 micrometer. In one embodiment, the average pore diameter may be less than about 1 micrometer, in a range of from about 1 micrometer to about 0.5 micrometers, from about 0.5 micrometers to about 0.25 micrometers, from about 0.25 micrometers to about 0.1 micrometers, or less than about 0.1 micrometers. In one embodiment, the average pore diameter may be in a range of from about 0.1 micrometers to about 0.01 micrometers.

In one embodiment, the base membrane may be a three-dimensional matrix or have a lattice type structure including plurality of nodes interconnected by a plurality of fibrils. Surfaces of the nodes and fibrils may define a plurality of pores in the membrane. The size of a fibril that has been at least partially sintered may be in a range of from about 0.05 micrometers to about 0.5 micrometers in diameter taken in a direction normal to the longitudinal extent of the fibril. The specific surface area of the porous membrane may be in a range of from about 9 square meters per gram of membrane material to about 110 square meters per gram of membrane material.

Surfaces of nodes and fibrils may define numerous interconnecting pores that extend through the membrane between opposite major side surfaces in a tortuous path. In one embodiment, the average effective pore size of pores in the membrane may be in the micrometer range. A suitable average effective pore size for pores in the membrane may be in a range of from about 0.01 micrometers to about 0.1 micrometers, from about 0.1 micrometers to about 5 microns, from about 5 micrometers to about 10 micrometers, or greater than about 10 micrometers.

In one embodiment, the base membrane may be made by extruding a mixture of fine powder particles and lubricant. The extrudate subsequently may be calendered. The calendered extrudate may be "expanded" or stretched in one or more directions, to form fibrils connecting nodes to define a three-dimensional matrix or lattice type of structure. "Expanded" means stretched beyond the elastic limit of the material to introduce permanent set or elongation to fibrils. The membrane may be heated or "sintered" to reduce and minimize residual stress in the membrane material by changing portions of the material from a crystalline state to an amorphous state. In one embodiment, the membrane may be unsintered or partially sintered as is appropriate for the contemplated end use of the membrane.

In one embodiment, the base membrane may define many interconnected pores that fluidly communicate with environments adjacent to the opposite facing major sides of the membrane. The propensity of the material of the membrane to permit a liquid material, for example, an aqueous polar liquid, to wet out and pass through pores may be expressed as a function of one or more properties. The properties may include the surface energy of the membrane, the surface tension of the liquid material, the relative contact angle between the material of the membrane and the liquid material, the size or effective flow area of pores, and the compatibility of the material of the membrane and the liquid material.

Membranes according to embodiments of the invention may have differing dimensions, some selected with reference to application-specific criteria. In one embodiment, the membrane may have a thickness in the direction of fluid flow in a range of less than about 10 micrometers. In another embodiment, the membrane may have a thickness in the direction of fluid flow in a range of greater than about 10 micrometers, for example, in a range of from about 10 micrometers to about 100 micrometers, from about 100 micrometers to about 1 millimeter, from about 1 millimeter to about 5 millimeters, or greater than about 5 millimeters. In one embodiment, the membrane may be formed from a plurality of differing layers.

Perpendicular to the direction of fluid flow, the membrane may have a width of greater than about 10 millimeters. In one embodiment, the membrane may have a width in a range of from about 10 millimeters to about 45 millimeters, from about 45 millimeters to about 50 millimeters, from about 50 millimeters to about 10 centimeters, from about 10 centimeters to about 100 centimeters, from about 100 centimeters to about 500 centimeters, from about 500 centimeters to about 1 meter, or greater than about 1 meter. The width may be a diameter of a circular area, or may be the distance to the nearest peripheral edge of a polygonal area. In one embodiment, the membrane may be rectangular, having a width in the meter range and an indeterminate length. That is, the membrane may be formed into a roll with the length determined by cutting the membrane at predetermined distances during a continuous formation operation.

A suitable coating may include a polyvinyl nucleophilic polymer or polymerizable material, and a cross-linker or cross-linking means. The coating may form an interpenetrating network or a cross-linked polymeric structure that mechanically binds the coating to the base membrane by interlinking with the pores of the base membrane. In one embodiment, the coating may have a chemical affinity for the base membrane, or a functional group capable of interacting with the base membrane. In one embodiment, the coating may be mechanically secured to the base membrane by an irreversible cross-linking or polymerization process.

Suitable polyvinyl nucleophilic polymers may include polyvinyl alcohol (PVA), polyvinyl amine, or a combination thereof. With particular reference to an embodiment in which polyvinyl alcohol is present, the polyvinyl alcohol may react with the cross-linker to form an irreversibly cross-linked, interpenetrating network, rather than forming a reversible complex. In one embodiment, the cross-linker may become part of the polymer matrix. In one embodiment, the cross-linker may function as a catalyst to promote cross-linking of reactive or functional groups, but the cross-linker may not be chemically bound into the matrix.

Suitable polyvinyl amine may be obtained commercially from BASF Corporation (Mount Olive, N.J.). The polyvinyl amine may include polyvinyl amine derivatives. Suitable derivatives may include one or more secondary amine groups, rather than a primary amine. In one embodiment, tertiary amines may be present on the polymer backbone in addition to at least one of a primary amine or a secondary amine. Suitable secondary amines may include one or more short chain hydrocarbons. The short chain hydrocarbon may be aliphatic, cycloaliphatic, or aromatic. In one embodiment, the short chain hydrocarbon may be methyl.

Suitable polyvinyl nucleophilic polymers may include those polyvinyl nucleophilic polymers having a molecular weight in a predetermined range of monomeric units. In one embodiment, the polyvinyl nucleophilic polymer molecular weight may be less than 2500. In one embodiment, the polyvinyl nucleophilic polymer molecular weight may be greater than 2500. In one embodiment, the polyvinyl nucleophilic polymer molecular weight may be in a range of from about 2500 to about 31,000, from about 31,000 to about 50,000, from about 50,000 to about 100,000, or greater than about 100,000.

Suitable cross linkers may include one or more blocked isocyanates or urethanes. Suitable blocked isocyanates may include a blocking agent, and one or more of aromatic polyisocyanates, aliphatic polyisocyanates, and/or cycloaliphatic polyisocyanates. In one embodiment, the polyisocyanates may include one or more of toluene di-isocyanate, diphenyl methane di-isocyanate, hexamethylene di-isocyanate, methylene bis-(4-cyclohexylisocyanate), naphthalene di-isocyanate, polymethylene polyphenyl isocyanate, meta tetramethyl xylene di-isocyanate, or dimethyl meta-isopropenyl benzyl isocyanate. Of note is that cross linkers in which the -NCO group is not conjugated to an aromatic ring, the cross linker is not characterized as aromatic despite the present of an aromatic group being present in the cross linker, for example meta tetramethyl xylene di-isocyanate may be considered aliphatic. In one embodiment, the cross linker may be selected with reference to the presence, number or amount of di-methyl pendant groups, or the like, which may provide steric hindrance to reduce hydroxyl reactivity, reduced hydrogen bonding propensity, and reduced carboxyl reactivity.

In one embodiment, the cross-linker comprises hexamethylene di-isocyanate or methylene bis-(4-cyclohexyl isocyanate). In one embodiment, the cross linker consists essentially of a blocking agent and hexamethylene di-isocyanate. In one embodiment, the cross linker consists essentially of a blocking agent and methylene bis-(4-cyclohexyl isocyanate).

Toluene di-isocyanate (TDI) may be room temperature liquid and is commercially available as a mixture of 2,4 and 2,6 isomers. TDI has a melting point at a temperature in a range of from about 20 degrees Celsius to about 22 degrees Celsius. In one commercial grade, TDI is available as 80% 2,4-TDI/20% 2,6-IDI and 65% 2,4-TDI/35% 2,6-TDI, where the melting point may be at a temperature of about 12 degrees Celsius. Diphenyl methane di-isocyanate (MDI) may be a room temperature solid. Modified MDI may be made by converting some of the isocyanate groups into carbodiimide groups, which may react with excess isocyanate. Liquid MDI may be made by the reaction of the diisocyanate with small amounts of glycols.

Hexamethylene di-isocyanate (HDI) (1,6- diisocyanate hexane) may be a room temperature liquid. At least two types of polyisocyanates may be made from HDI: HDI-biuret type, and Isocyanurate type HDI. HDI-biuret type is a homopolymer of HDI (or polymeric HDI), and may be obtained by treating HDI with water. HDI-biuret may contain less than about 0.7% HDI. HDI-Isocyanurates may contain less than 0.3% HDI when first produced. HDI and its polymers may be soluble in non-polar solvents, such as xylene and toluene. HDI may be expressed by the structure shown in formula (I):

OCN—(CH$_2$)$_6$—NCO     (I)

Methylene bis-(4-cyclohexylisocyanate) (HMDI) and its polymers may be soluble in non-polar solvents, such as xylene and toluene. HMDI may be expressed by the structure shown in formula (II):

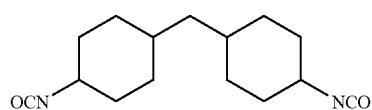

Naphthalene di-isocyanate (NDI) and methyl isocyanate (MIC) may be room temperature solids. Polymethylene polyphenyl isocyanate (PMPPI) may be a room temperature liquid, and may include from about 40 weight percent to about 60 weight percent of 4,4'-MDI, the remainder being other isomers of MDI (e.g., 2,4' and 2') trimeric species and higher molecular weight oligomers.

Another suitable isocyanate may include a material having the formula (III):

A polymerization or cross-linking of a polyfunctional alcohol using the isocyanate material of formula (III), after unblocking, may be expressed as:

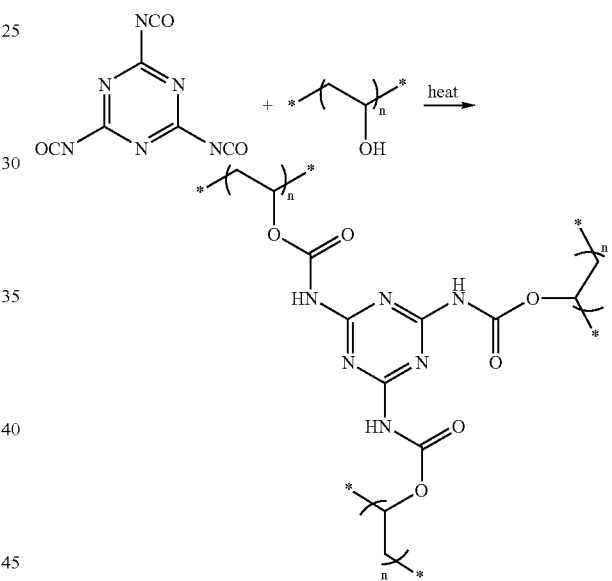

Suitable blocked isocyanates may be commercially available, and/or may be formed from, for example, a reaction of an isocyanate with a blocking agent, such as malonic ester. Other suitable blocking agents may include one or more amines, such as diisopropyl amine (DIPA) or t-butyl benzyl amine (BEBA). Yet other suitable blocking agents may include one or more of 3,5 dimethyl pyrazole; methyl ethyl ketoxime; caprolactam; or alkylated phenol.

Some blocking agents may unblock in response to the application of heat. For example, 3,5 dimethyl pyrazole may unblock at 110 degrees Celsius; methyl ethyl ketoxime may unblock at 150 degrees Celsius; malonic acid esters may unblock at 90 degrees Celsius; caprolactam may unblock at 160 degrees Celsius; and alkylated phenol may unblock at greater than about 110 degrees Celsius. Optional accelerators, when present, may decrease the unblocking temperature to as low as about room temperature.

Suitable urethanes may include one or both of urethane materials or blocked isocyanates. An example of a suitable urethane may include CYMEL 1158 or CYLINK 2000, which are commercially available from Cytec Engineered Materials Inc. (Anaheim, Calif.). A suitable pH may be in a range of from about 3 to about 6. A suitable equivalent weight may be about 250. The toxicity may be relatively lower compared to low molecular weight isocyanates. Viscosity at about 23 degrees Celsius may be about 10 megaPascal (mPa) per second.

In one embodiment, the urethane may include a material having the formnula (IV), wherein R is independently at each occurrence a C1 to C4 alkyl (e.g., methyl or butyl) at a 60/40 ratio:

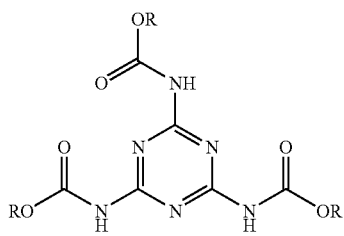

(IV)

A polymerization or cross-linking of a polyfunctional alcohol using the urethane material of formula (IV) may be expressed as:

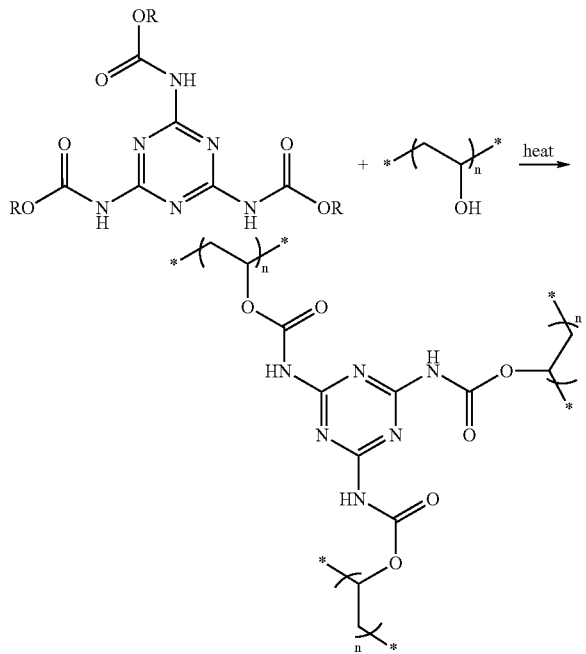

Ammonium salts or amines (such as 4-dimethyl aminopyridine) may be used to accelerate urethane cross-linking, which may be otherwise performed at, for example, about 100 degrees Celsius to about 110 degrees Celsius. In one embodiment, about 0.5 weight percent of dodecyl benzene sulfonic acid may be added to improve hydrolytic stability and/or hardness.

Suitable amounts of cross-linker may be greater than about 1 weight percent based on the polymer. In one embodiment, the amount of cross-linker present may be in a range of from about 1 weight percent to about 5 weight percent, from about 5 weight percent to about 10 weight percent, from about 10 weight percent to about 15 weight percent, from about 15 weight percent to about 20 weight percent, from about 20 weight percent to about 25 weight percent, from about 25 weight percent to about 30 weight percent, from about 30 weight percent to about 40 weight percent, from about 40 weight percent to about 50 weight percent, from about 50 weight percent to about 60 weight percent, from about 60 weight percent to about 75 weight percent, or greater than about 75 weight percent based on the total weight of the polyvinyl nucleophilic polymeric precursor.

While at least some polyfunctionality should be present in the cross linker, monofunctional cross linkers also may be present. The use of monofunctional cross linkers may aid in the control of properties associated with the hydrophilic coating of the microporous membrane.

A suitable cross-linked interpenetrating network may have a flexible and non-rigid backbone. In one embodiment, a flexible interpenetrating network may be free or essentially free of epoxy or glycidyl ether functionality (cured or monomeric).

In one embodiment, the coating may be deposited onto the membrane without blocking the pores of the membrane. The coating may be compatible with the material of the membrane and may impart hydrophilic properties to the membrane surface. Compatible means that the coating material may "wet-out" the surface of the membrane. In one embodiment, the coating may be without voids and/or "pin holes" to form a continuous coating. In another embodiment, the coating may have discontinuous portions.

In one embodiment, the coating forms a layer having an average thickness in a range of from about 1 nanometer to about 500 nanometers, from about 500 nanometers to about 1 micrometer, from about 1 micrometer to about 5 micrometers, or greater than about 5 micrometers. The coating layer may be uniform in thickness, or may have a thickness that differs from area to area.

A membrane prepared according to embodiments of the invention may have one or more predetermined properties. Such properties may include one or more of a wetability of a dry-shipped membrane, a wet/dry cycling ability, filtering of polar liquid or solution, flow of non-aqueous liquid or solution, flow and/or permanence under low pH conditions, flow and/or permanence under high pH conditions, flow and/or permanence at room temperature conditions, flow and/or permanence at elevated temperature conditions, flow and/or permanence at elevated pressures, transparency to energy of predetermined wavelengths, transparency to acoustic energy, or support for catalytic material. Permanence refers to the ability of the coating material to maintain function in a continuing manner, for example, for more than 1 day or more than one cycle (wet/dry, hot/cold, high/low pH, and the like).

A property of at least one embodiment may include a resistance to temperature excursions in a range of greater than about 100 degrees Celsius, for example, in autoclaving operations. In one embodiment, the temperature excursion may be in a range of from about 100 degrees Celsius to about 125 degrees Celsius, from about 125 degrees Celsius to about 135 degrees Celsius, or from about 135 degrees Celsius to about 150 degrees Celsius. Optionally, the temperature excursion also may be at an elevated pressure relative ambient. The temperature excursion may be for a period of greater than about 15 minutes.

Resistance to ultraviolet (UV) radiation may allow for sterilization of the membrane, in one embodiment, without loss of properties. Of note is an alternative embodiment in which cross-linking of the coating composition may be initiated or facilitated by exposure to an irradiation source, such as an ultraviolet source, where UV initiators may compete with UV absorbing compositions, if present.

Flow rate of fluid through the membrane may be dependent on one or more factors. The factors may include one or more of the physical and/or chemical properties of the membrane, the properties of the fluid (e.g., viscosity, pH, solute, and the like), environmental properties (e.g., temperature, pressure, and the like), and the like. In one embodiment, the membrane may be permeable to vapor rather than, or in addition to, fluid or liquid. A suitable vapor transmission rate, where present, may be in a range of less than about 1000 grams per square meter per day ($g/m^2/day$), from about 1000 $g/m^2/day$ to about 1500 $g/m^2/day$, from about 1500 $g/m^2/day$ to about 2000 $g/m^2/day$, or greater than about 2000 m 2/day. In one embodiment, the membrane may be selectively impermeable to liquid or fluid, while remaining permeable to vapor.

The membrane may be used to filter water. In one embodiment, the water may flow through the membrane at a flow rate that is greater than about 1 mL/min-cm at 27 inches Hg pressure differential at room temperature after 10 wet/dry cycles. In one embodiment, the water may flow through the membrane at a flow rate that is greater than about 1 ml/min-cm at 27 inches Hg pressure differential at about 100 degrees Celsius after 10 wet/dry cycles. In one embodiment, the water may flow through the membrane at a flow rate that is greater than about 10 mL/min-cm at 27 inches Hg pressure differential at room temperature after 10 wet/dry cycles. In one embodiment, the water may flow through the membrane at a flow rate that is greater than about 10 mL/min-cm at 27 inches Hg pressure differential at 100 degrees Celsius after 10 wet/dry cycles. In one embodiment, the water may flow through the membrane at a flow rate that is greater than about 20 ml/min-cm at 27 inches Hg pressure differential at room temperature after 10 wet/dry cycles. In one embodiment, the water may flow through the membrane at a flow rate that is greater than about 20 m/min-cm at 27 inches Hg pressure differential at about 100 degrees Celsius after 10 wet/dry cycles. In one embodiment, the water may flow through the membrane at a flow rate that is greater than about 1 mL/min-cm at 27 inches Hg pressure differential at room temperature after 20 wet/dry cycles. In one embodiment, the water may flow through the membrane at a flow rate that is greater than about 1 mL/min-cm at 27 inches Hg pressure differential at 100 degrees Celsius after 20 wet/dry cycles. In one embodiment, the water may flow through the membrane at a flow rate that is greater than about 10 mL/min-cm at 27 inches Hg pressure differential at room temperature after 20 wet/dry cycles. In one embodiment, the water may flow through the membrane at a flow rate that is greater than about 10 mL/min-cm at 27 inches Hg pressure differential at 100 degrees Celsius after 20 wet/dry cycles. In one embodiment, the water may flow through the membrane at a flow rate that is greater than about 20 mL/min-cm at 27 inches Hg pressure differential at room temperature after 50 wet/dry cycles.

Stability of membranes according to embodiments of the invention may be measured with reference to the pressure drop across the membrane after one or more wet/dry cycles. That is, the membrane may return repeatedly to about the same pressure drop after multiple wet/dry cycles. In one embodiment, the membrane may return to within about 10 percent relative to an immediately preceding pressure drop. In one embodiment, the extractables from the membrane are less than about 0.5 percent by weight after each of about 10 wet/dry cycles to about 20 wet/dry cycles using water at room temperature or at about 100 degrees Celsius.

In one embodiment, the membrane may be absorbent, such as water or bodily fluid absorbent. Absorbent may include insignificant amounts of fluid influx and outflow when maintaining equilibrium with a fluidic environment. However, absorbent is distinguishable, and distinguished from, flowable. Flow includes an ability of liquid or fluid to flow from a first surface through the membrane and out a second surface. Thus, in one embodiment, the membrane may be operable to have a liquid or fluid flow through at least a portion of the material in a predetermined direction. The motive force may be osmotic or wicking, or may be driven by one or more of a concentration gradient, pressure gradient, temperature gradient, or the like.

The membrane may have a plurality of sub layers. The sub layers may be the same as, or different from, each other. In one aspect, one or more sub layer may include an embodiment of the invention, while another sub layer may provide a property such as, for example, reinforcement, selective filtering, flexibility, support, flow control, and the like.

A membrane according to embodiments of the invention may be used as, for example, a proton exchange membrane (PEM) in a fuel cell. Other suitable applications may include liquid filtration, polarity-based chemical separations, electrolysis, batteries, pervaporization, gas separation, dialysis separation, industrial electrochemistry such as chloralkali production and electrochemical applications, super acid catalysts, or use as a medium in enzyme immobilization. Still other suitable applications may include medical devices, such as tissue growth scaffolding.

EXAMPLES

The following examples are intended only to illustrate methods and embodiments in accordance with the invention, and as such should not be construed as imposing limitations upon the claims. Unless specified otherwise, all ingredients are commercially available from such common chemical suppliers as Alpha Aesar, Inc. (Ward Hill, Mass.), Spectrum Chemical Mfg. Corp. (Gardena, Calif.), Cytec Engineered Materials Inc. (Anaheim, Calif.), and the like.

Example 1

Preparation of Coating Solution

Into a 250 milliliter Erlenmeyer flask, 1 gram of polyvinyl alcohol (PVA) (Mw=31000 to 50000), a magnetic stirring bar, and 49 grams of water are placed at room temperature. The suspension is stirred rigorously at about 90 degrees Celsius until a solution is obtained. The PVA-water solution is cooled to room temperature. If necessary, excess water is added to achieve a total weight of about 50 grams in the flask. The solution is ready to treat an ePTE membrane pre-wetted with isopropyl alcohol (IPA)/water. Note that the addition of IPA to the solution may reduce or eliminate the need for a pre-wet membrane. The amount of EPA that can be added is proportional to the degree of hydrolysis in the PVA used.

Example 2

Treatment of Membrane

Eight virgin expanded polytetrafluoroethylene (ePTFE) membranes are pre-wet with IPA/water and then treated with the solution from Example 1 and a solution of blocked 1,6- diisocyanato hexane. The coated membranes are heated to unblock the isocyanate, and to cross-link the PVA and cross-linker. Cross-linking forms a network of mechanical interlocks on the treated membrane.

The treated membranes samples readily wet out when contacted with liquid water. The initial water flow rate is evaluated. Four of the samples are subjected to five wet/dry cycles using water at 22 degrees Celsius. The samples all continued to flow water there through after the cycling.

Another four of the samples are subjected to wet/dry cycles using water at 100 degrees Celsius. The samples continue to flow water there through after at least 3 hot water wet/dry test cycles at 1 liter per cycle. Various subsequent flow rates are observed. The flow rates range from 1 mL/min-cm$^2$ to 35 mL/min-cm$^2$ at 27 millimeters of Hg pressure drop.

Example 3

Preparation and Testing of Differing Coating Solutions

Into each of fifteen 250 milliliter Erlenmeyer flasks are placed: 1 gram portions of polyvinyl alcohol (PVA), a magnetic stirring bar and 49 grams of room temperature water. The flasks are identified as Samples 1-15. After stirring at about 90 degrees Celsius, the PVA in each of the Samples dissolves into the water. The solutions are cooled and the total weight is adjusted to achieve a total weight of 50 grams, followed by the addition of IPA (~70-200 wt % with respect to the weight of water) under vigorous stirring and the corresponding amount of urethane (IV) (see table).

The weight percent of urethane (IV) and molecular weight (Mw) of the PVA for each of the Samples is shown in Table 1. Samples 1-5 use 2 weight percent, Samples 6-10 use 5 weight percent, and Samples 11-15 use 10 weight percent of cross-linker based on the weight of the polyvinyl nucleophilic polymeric material.

TABLE 1

Molecular weights (Mw) of PVA and the corresponding weight percent of urethane (IV) in Samples 1-15.

| Sample # | Mw (×10$^3$) | Cross-Linking Agent |
|---|---|---|
| 1 | 9-10 | Urethane having formula (IV) 2 wt % vs. PVA |
| 2 | 13-23 | Urethane having formula (IV) 2 wt % vs. PVA |
| 3 | 31-50 | Urethane having formula (IV) 2 wt % vs. PVA |
| 4 | 85-124 | Urethane having formula (IV) 2 wt % vs. PVA |
| 5 | 146-186 | Urethane having formula (IV) 2 wt % vs. PVA |
| 6 | 9-10 | Urethane having formula (IV) 5 wt % vs. PVA |
| 7 | 13-23 | Urethane having formula (IV) 5 wt % vs. PVA |
| 8 | 31-50 | Urethane having formula (IV) 5 wt % vs. PVA |
| 9 | 85-124 | Urethane having formula (IV) 5 wt % vs. PVA |
| 10 | 146-186 | Urethane having formula (IV) 5 wt % vs. PVA |
| 11 | 9-10 | Urethane having formula (IV) 10 wt % vs. PVA |
| 12 | 13-23 | Urethane having formula (IV) 10 wt % vs. PVA |
| 13 | 31-50 | Urethane having formula (IV) 10 wt % vs. PVA |
| 14 | 85-124 | Urethane having formula (IV) 10 wt % vs. PVA |
| 15 | 146-186 | Urethane having formula (IV) 10 wt % vs. PVA |

Each solution is applied to a correspondingly numbered microporous ePTFE membrane (for a total of 15 sample coated membranes) without the prewetting. The fifteen untreated membranes are sprayed with the solution, and then dip-coated in same solution to aid in complete fluid penetration of the membrane pores. Each of the membranes is heated to a temperature to initiate cross-linking of the PVA by the cross-linker—sufficient temperature is about 110 degrees Celsius—for a period of about 2 hours. The curing temperature dries the membranes.

The membranes are each tested for re-wettability, pH resistance, and flow rate after being exposed to sets of wet/dry cycles. The water temperature during the wet/dry cycles and during the flow testing is room temperature. The water volume that passes through the membrane for the flow rate test is 1 liter per cycle. The results are listed in Table 2. After testing for re-wettability and flow rate, the membranes are subjected to pH cycling from a pH of about 1 to a pH of about 14 for 10 cycles. There is no appreciable drop in the flow rate after additional wet/dry cycles post-pH cycling.

TABLE 2

Results of tests

| | |
|---|---|
| After 10 wet/ dry cycles | Each membrane readily wets out from an initially dry state, and the flow rate of water is greater than about 1 mL/min-cm$^2$ at 27 inches Hg pressure differential. |
| After 20 wet/ dry cycles | Each membrane readily wets out from an initially dry state, and the flow rate of water is greater than about 1 mL/min-cm$^2$ at 27 inches Hg pressure differential. |
| After 30 wet/ dry cycles | Each membrane readily wets out from an initially dry state, and the flow rate of water is greater than about 1 mL/min-cm$^2$ at 27 inches Hg pressure differential. |

Example 4

Preparation and Testing of Differing Coating Solutions

Fifteen new membranes were prepared and tested as shown in Example 3, except as follows. The water temperature during the wet/dry cycles and during the flow testing is boiling (i.e., 100 degrees Celsius). The membranes in Example 4 are not provided with individual sample numbers. The results are listed in Table 3.

TABLE 3

Results of tests

| | |
|---|---|
| After 10 wet/ dry cycles | Each membrane readily wets out from an initially dry state, and the flow rate of water is greater than about 1 mL/min-cm$^2$ at 27 inches Hg pressure differential. |
| After 20 wet/ dry cycles | Each membrane readily wets out from an initially dry state, and the flow rate of water is greater than about 1 mL/min-cm$^2$ at 27 inches Hg pressure differential. |
| After 30 wet/ dry cycles | Each membrane readily wets out from an initially dry state, and the flow rate of water is greater than about 1 mL/min-cm$^2$ at 27 inches Hg pressure differential. |

After testing for re-wettability and flow rate, the fifteen membranes are subjected to pH cycling from a pH of about 1 to a pH of about 14 for 10 cycles. There is no appreciable drop in the flow rate after additional wet/dry cycles post-pH cycling.

Example 5

Preparation of Polyvinyl Amine Polymer

A polyvinyl amine polymer is prepared by the Hofmann degradation of polyacrylamide to give polyvinyl amine.

Example 6

Preparation of Coating Solution

Into a 250 milliliter Erlenmeyer flask, 1 gram of polyvinyl amine (Mw=30000 to 50000), a magnetic stirring bar, and 49 grams of water are placed at room temperature. The suspension is stirred rigorously at about 90 degrees Celsius until a solution is obtained. If necessary, excess water is added to achieve a total weight of about 50 grams in the flask. The polyvinyl amine-water solution is cooled to room temperature. The solution is ready to treat an ePTFE membrane pre-wetted with isopropyl alcohol (IPA)/water. Note that the addition of IPA to the solution may reduce or eliminate the need for a pre-wet membrane.

Example 7

Treatment of Membrane

Eight virgin expanded polytetrafluoroethylene (eFFFE) membranes are pre-wet with IPA/water and then treated with the solution from Example 6 and a solution containing a blocked isocyanate cross linker. The coated membranes are heated to unblock the isocyanate, and to cross-link the polyvinyl amine with the cross linker to form a network of mechanical interlocks on the treated membrane.

The treated membranes samples readily wet out when contacted with liquid water. The initial water flow rate is evaluated. Four of the samples are subjected to five wet/dry cycles using water at 25 degrees Celsius. The samples all continued to flow water there through after the cycling.

Another four of the samples are subjected to wet/dry cycles using water at 100 degrees Celsius. The samples continue to flow water there through after at least 3 hot water wet/dry test cycles at 1 liter per cycle. Various subsequent flow rates are observed. The flow rates are at least 1 mL/min-cm, with a 27 mm Hg pressure drop. Note that flow rate is a function of pore size and polymer concentration in the coating solution.

Example 8

Preparation and Testing of Differing Coating Solutions

Into each of fifteen 250 milliliter Erlenmeyer flasks are placed: 1 gram portions of polyvinyl amine, a magnetic stirring bar and 49 grams of room temperature water. The flasks are identified as Samples 16-30. After stirring at about 90 degrees Celsius (where necessary), the polyvinyl amine in each of the Samples dissolves into the water. The solutions are cooled and the total weight is adjusted to achieve a total weight of 50 grams, followed by the addition of IPA (~70-200 wt % with respect to the weight of water) under vigorous stirring and the corresponding amount of urethane (IV) (see table).

The weight percent of urethane (IV) and molecular weight (Mw) of the polyvinyl amine for each of the Samples is shown in Table 4. Samples 16-20 use 2 weight percent, Samples 21-25 use 5 weight percent, and Samples 26-30 use 10 weight percent of cross-linker based on the weight of the polyvinyl nucleophilic polymeric material.

TABLE 4

Molecular weights of polyvinyl amine and the corresponding weight percent of urethane (IV) in Samples 16-30.

| Sample # | Mw ($\times 10^3$) | Cross-Linker |
|---|---|---|
| 16 | 5 | Urethane having formula (IV) 2 wt % vs. polyvinyl amine |
| 17 | 20 | Urethane having formula (IV) 2 wt % vs. PVA |
| 18 | 50 | Urethane having formula (IV) 2 wt % vs. polyvinyl amine |
| 19 | 100 | Urethane having formula (IV) 2 wt % vs. polyvinyl amine |
| 20 | 200 | Urethane having formula (IV) 2 wt % vs. polyvinyl amine |
| 21 | 5 | Urethane having formula (IV) 5 wt % vs. polyvinyl amine |
| 22 | 20 | Urethane having formula (IV) 5 wt % vs. polyvinyl amine |
| 23 | 50 | Urethane having formula (IV) 5 wt % vs. polyvinyl amine |
| 24 | 100 | Urethane having formula (IV) 5 wt % vs. polyvinyl amine |
| 25 | 200 | Urethane having formula (IV) 5 wt % vs. polyvinyl amine |
| 26 | 5 | Urethane having formula (IV) 10 wt % vs. polyvinyl amine |
| 27 | 20 | Urethane having formula (IV) 10 wt % vs. polyvinyl amine |
| 28 | 50 | Urethane having formula (IV) 10 wt % vs. polyvinyl amine |
| 29 | 100 | Urethane having formula (IV) 10 wt % vs. polyvinyl amine |
| 30 | 200 | Urethane having formula (IV) 10 wt % vs. polyvinyl amine |

Each solution is applied to a correspondingly numbered microporous ePTFE membrane (for a total of 15 samples coated membranes). The fifteen untreated membranes are sprayed with the solution, and then dip-coated in same solution to aid in complete fluid penetration of the membrane pores Each of the membranes is heated to a temperature to initiate cross-linking of the polyvinyl amine by the cross-linker—sufficient temperature is about 110 degrees Celsius—for a period of about 2 hours. The curing temperature dries the membranes.

The membranes are each tested for re-wettability, pH resistance, and flow rate after being exposed to sets of wet/dry cycles. The water temperature during the wet/dry cycles and during the flow testing is room temperature. The water volume that passes through the membrane for the flow rate test is 1 liter. The results are listed in Table 5. After testing for re-wettability and flow rate, the membranes are subjected to pH cycling from a pH of about 3 to a pH of about 12 for 10 cycles. There is no appreciable drop in the flow rate after additional wet/dry cycles post-pH cycling.

TABLE 5

Results of tests

| | |
|---|---|
| After 10 wet/ dry cycles | Each membrane readily wets out from an initially dry state, and the flow rate of water is greater than about 1 mL/min-cm at 27 inches Hg pressure differential. |
| After 20 wet/ dry cycles | Each membrane readily wets out from an initially dry state, and the flow rate of water is greater than about 1 mL/min-cm at 27 inches Hg pressure differential. |
| After 30 wet/ dry cycles | Each membrane readily wets out from an initially dry state, and the flow rate of water is greater than about 1 mL/min-cm at 27 inches Hg pressure differential. |

Example 9

Preparation and Testing of Differing Coating Solutions

Fifteen new membranes were prepared and tested as shown in Example 8, except as follows. The water temperature during the wet/dry cycles and during the flow testing is boiling (i.e., 100 degrees Celsius). The membranes of Example 9 are not identified by individual sample numbers. The results are listed in Table 6.

TABLE 6

Results of tests

| After 10 wet/ dry cycles | Each membrane readily wets out from an initially dry state, and the flow rate of water is greater than about 1 mL/min-cm at 27 inches Hg pressure differential. |
| After 20 wet/ dry cycles | Each membrane readily wets out from an initially dry state, and the flow rate of water is greater than about 1 mL/min-cm at 27 inches Hg pressure differential. |
| After 30 wet/ dry cycles | Each membrane readily wets out from an initially dry state, and the flow rate of water is greater than about 1 mL/min-cm at 27 inches Hg pressure differential. |

After testing for re-wettability and flow rate, the fifteen membranes are subjected to pH cycling from a pH of about 3 to a pH of about 12 for 10 cycles. There is no appreciable drop in the flow rate after additional wet/dry cycles post-pH cycling.

The embodiments described herein are examples of compositions, structures, systems and methods having elements corresponding to the elements of the invention recited in the claims. This written description may enable those of ordinary skill in the art to make and use embodiments having alternative elements that likewise correspond to the elements of the invention recited in the claims. The scope of the invention thus includes compositions, structures, systems and methods that do not differ from the literal language of the claims, and further includes other structures, systems and methods with insubstantial differences from the literal language of the claims. While only certain features and embodiments have been illustrated and described herein, many modifications and changes may occur to one of ordinary skill in the relevant art. The appended claims cover all such modifications and changes.

What is claimed is:

1. A membrane, comprising:
A microporous base membrane; and a cross-linkable coating disposed on a surface of the membrane, and the coating comprising a polyvinyl nucleophilic polymer and a blocked isocyanate, or the blocked isocyanate and a urethane, wherein the blocked isocyanate comprises a blocking agent, and the blocking agent comprises at least one of a nitrogen-containing moiety, and ester moiety, or an oxime moiety; wherein the coating forms a hydrophilic interpenetrating network comprising inter/intramolecular ammonium-carboxylate ion pairs.

2. The membrane as defined in claim 1, wherein the base membrane comprises one or more of polyethylene, polyolefin, polyamide, polyester, polysulfone, polyether, polyacrylic, polymethacrylic, polystyrene, polyurethane, polypropylene, polyphenelene sulfone, polyphenylene oxide, or cellulosic polymer.

3. The membrane as defined in claim 1, wherein the polyvinyl nucleophilic polymer comprises one or both of polyvinyl alcohol or polyvinyl amine.

4. The membrane as defined in claim 3, wherein the polyvinyl alcohol has an average molecular weight in a range of greater than 2500.

5. The membrane as defined in claim 4, wherein the polyvinyl alcohol has an average molecular weight in a range of greater than 2500 to about 31,000.

6. The membrane as defined in claim 1, wherein the cross linkable coating comprises one or more of toluene disocyanate, diphenyl methane di-isocyanate, hexamethylene di-isocyanate, methylene bis-(4-cyclohexylisocyanate), naphthalene di-isocyanate, methyl isocyanate, or polymethylene polyphenyl isocyanate.

7. The membrane as defined in claim 1, wherein the cross linkable coating comprises a material having the formula (III):

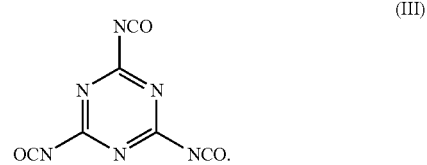

8. The membrane as defined in claim 1, wherein the blocked isocyanate is present in an amount in a range of greater than about 10 weight percent.

9. The membrane as defined in claim 1, wherein the urethane comprises a material having the formula (IV):

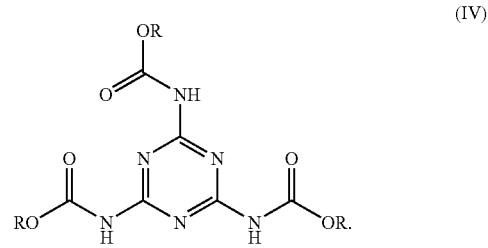

10. The membrane as defined in claim 1, wherein the coating has an average thickness in a range of from about 1 nanometer to greater than about 1 micrometer.

11. A treated membrane comprising the membrane as defined in claim 1 wherein the coating is cross-linked to form the treated membrane, and the coating renders the membrane wetable from a dry ship state.

12. The treated membrane as defined in claim 11, wherein the treated membrane has a flow rate of water that is greater than about 1 mL/min-cm at 27 inches Hg pressure differential after 10 wet/dry cycles at room temperature.

13. The treated membrane as defined in claim 11, wherein the treated membrane has a flow rate of water that is greater than about 1 mL/min-cm at 27 inches Hg pressure differential after 10 wet/dry cycles at 100 degrees Celsius.

14. A method of forming a membrane, comprising:
applying a coating to a surface of a porous base membrane, wherein the coating comprises a polyvinyl nucleophilic polymer and a blocked isocyanate
wherein the blocked isocyanate comprises a blocking agent, and the blocking agent comprises at least one of a nitrogen-containing moiety, an ester moiety, or an oxime moiety; and
unblocking the blocked isocyanate to form a hydrophilic interpenetrating network comprising one or both of carboxylic acid groups or inter/intramolecular ammonium-carboxylate ion pairs.

15. The method as defined in claim 14, further comprising non-thermally curing the coated membrane.

16. The method as defined in claim 14, further comprising thermally curing the coated membrane.

17. The method as defined in claim 16, wherein thermally curing the coated membrane comprises heating the membrane to a cure temperature that is greater than about 100 degrees Celsius.

18. The method as defined in claim 14, further comprising cycling the membrane though wet/dry cycles after cure.

19. The method as defined in claim 18, further comprising flowing water though the membrane at a flow rate that is greater than about 1 mL/min-cm at 27 inches Hg pressure differential at room temperature after 10 wet/dry cycles.

20. The method as defined in claim 18, further comprising flowing water though the membrane at a flow rate that is greater than about 1 mL/min-cm at 27 inches Hg pressure differential at 100 degrees Celsius after 10 wet/dry cycles.

21. The method as defined in claim 14, wherein the polyvinyl nucleophilic polymer comprises one or both of polyvinyl alcohol or polyvinyl amine.

22. The method as defined in claim 14, wherein the coating comprises one or more of toluene di-isocyanate, diphenyl methane di-isocyanate, hexamethylene di-isocyanate, methylene bis-(4-cyclohexylisocyanate), naphthalene di-isocyanate, methyl isocyanate, or polymethylene polyphenyl isocyanate.

* * * * *

UNITED STATES PATENT AND TRADEMARK OFFICE
CERTIFICATE OF CORRECTION

| | |
|---|---|
| PATENT NO. | : 7,381,331 B2 |
| APPLICATION NO. | : 11/241227 |
| DATED | : June 3, 2008 |
| INVENTOR(S) | : Hieu Minh Duong et al. |

Page 1 of 1

It is certified that error appears in the above-identified patent and that said Letters Patent is hereby corrected as shown below:

In claim 6, column 16, lines 2-3, at the only instance thereof, replace "disocyanate" with -- di-isocyanate --.

Signed and Sealed this

Twenty-sixth Day of August, 2008

JON W. DUDAS
*Director of the United States Patent and Trademark Office*